Feb. 14, 1933. C. M. TERRY 1,897,448
CONTROL APPARATUS
Filed April 8, 1932
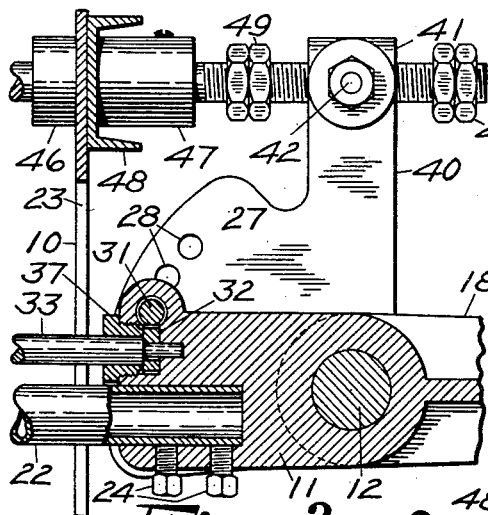
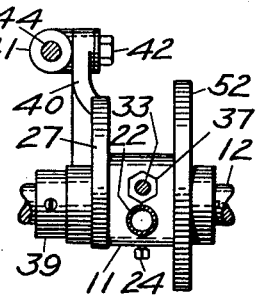
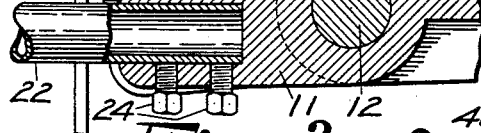
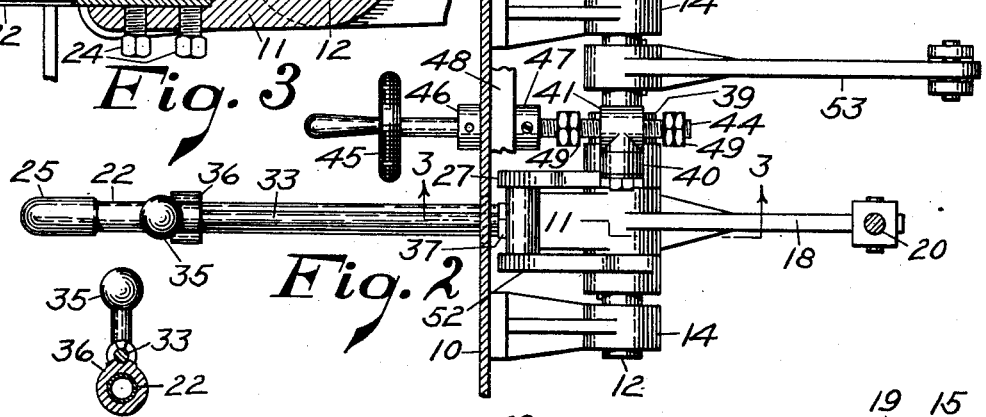
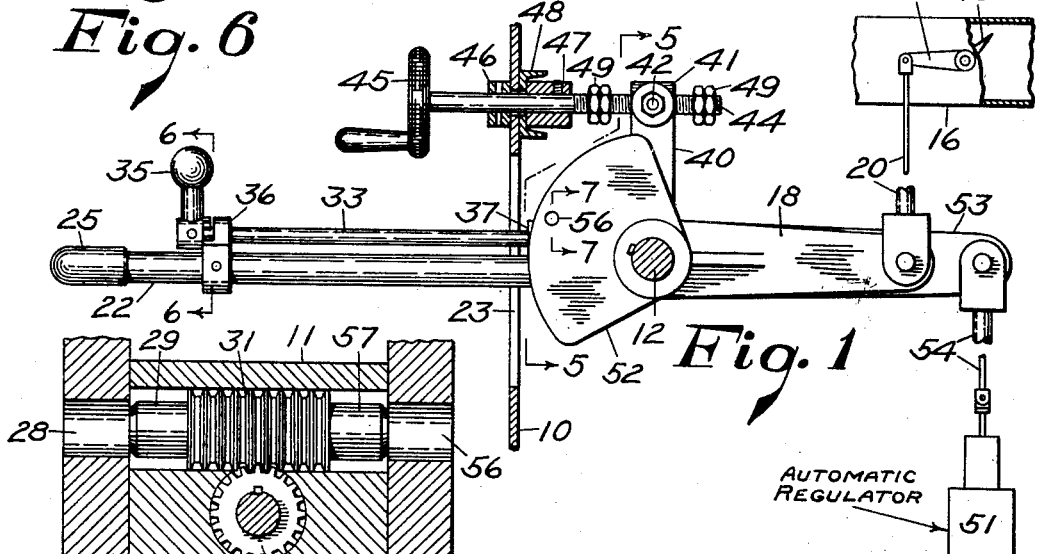
INVENTOR
CHARLES M. TERRY
BY
Albert G. Blodgett
ATTORNEY Patented Feb. 14, 1933

1,897,448

UNITED STATES PATENT OFFICE

CHARLES M. TERRY, OF DECATUR, ILLINOIS, ASSIGNOR TO A. W. CASH COMPANY, OF DECATUR, ILLINOIS, A CORPORATION OF DELAWARE

CONTROL APPARATUS

Application filed April 8, 1932. Serial No. 604,047.

This invention relates to control apparatus, and more particularly to a mechanism whereby a movable element, such as a damper, may be actuated either automatically or manually at the will of the operator.

In the art of burning fuel, it is desirable that the various elements which control the combustion should be normally actuated by automatic mechanisms, but there are times, such as the starting-up periods, when manual actuation is either essential or at least preferable. Furthermore, there is always a possibility of failure of some part of the automatic mechanism, and safety considerations necessitate some construction whereby the operator may assume control in such an emergency. Similar problems are encountered in various other arts to which the invention is applicable.

It is accordingly one object of the invention to provide a simple and effective apparatus whereby a movable element may be either actuated manually or connected to an automatic mechanism.

It is a further object of the invention to provide an apparatus of this type which is so arranged that the operator may ascertain at a glance whether the device is adjusted for automatic or for manual control.

It is a further object of the invention to provide an apparatus whereby a movable element may be either controlled automatically or moved manually at a rapid rate to approximately the desired position and then adjusted slowly and accurately by a further manual control.

With these and other objects in view, as will be apparent to those skilled in the art, the invention resides in the combination of parts set forth in the specification and covered by the claims appended hereto.

In accordance with my invention, I provide a member which is pivotally supported adjacent to and preferably between a pair of plates. One of the plates is pivotally supported coaxially with the member, and is actuated by an automatic regulator. The other plate is normally stationary, but is preferably arranged for a limited manual adjustment about the same axis as the other parts. The central member can be connected to either of the plates or it can be disconnected from both of them and moved directly by hand. The movable element which is to be controlled is connected to the central member and moves therewith.

Referring to the drawing illustrating one embodiment of the invention, and in which like reference numerals indicate like parts, Fig. 1 is a side elevation of a control apparatus with its associated automatic regulator and the movable element which is to be controlled, certain parts being shown in section for clearness of illustration;

Fig. 2 is a plan view of the control apparatus;

Fig. 3 is an enlarged section on the line 3—3 of Fig. 2;

Fig. 4 is a detail of the stationary plate;

Fig. 5 is a section on the line 5—5 of Fig. 1;

Fig. 6 is a section on the line 6—6 of Fig. 1; and

Fig. 7 is an enlarged section on the line 7—7 of Fig. 1.

The embodiment illustrated comprises a supporting structure shown as a vertical panel 10 which is preferably installed in a position convenient to the operator. A member 11 is located in the rear of the panel, and this member is arranged to pivot about a horizontal axis. In the preferred construction I provide a horizontal shaft 12 on which the member 11 is pivotally supported, the shaft in turn being rotatably mounted in bearings 14 for a purpose which will be explained hereinafter.

The member 11 is connected to a movable element which is to be controlled, and which is shown in the drawing as a damper 15 mounted in a duct 16. The damper 15 is typical of various other elements, such as valves, rheostates, regulatable feeders, etc., which may be controlled by means of my invention. The member 11 as shown is formed with a rearwardly projecting arm 18, and this arm is connected to the operating arm 19 of the damper by means of a rod 20.

In order that the damper may be actuated manually when necessary, I provide an operating handle 22 which extends forwardly from the member 11 through a vertical slot 23 in the panel 10. This handle may be conveniently formed of a straight pipe held in place by set screws 24. A hand grip 25 may be provided at the forward end of the pipe. By moving the handle 22 up or down, the damper 15 may be closed or opened as desired.

The operator should be able to lock the damper in any given position of adjustment, so that it will not be moved accidentally. For this purpose I provide a normally stationary plate 27 mounted at one side of the member 11, together with a manually operable mechanism whereby the member may be connected to the plate. In the preferred construction illustrated, the plate 27 is provided with a plurality of spaced circular openings 28 located in a circular arc having its center on the axis of the shaft 12, and a bolt or pin 29 (Fig. 7) is mounted in the member 11 and arranged to slide axially into engagement with a selected one of the openings 28. The pin 29 is shown parallel to the shaft 12. A rack 31 is connected to the pin 29, the rack teeth being preferably integral with the pin, and a driving spur pinion 32 is mounted beneath and in mesh with the rack. The pinion 32 is keyed to the rear portion of a shaft 33 which extends forwardly through the slot 23 and just above the handle 22. The forward end of the shaft 33 is provided with a handle 35 and rotatably supported in a bearing 36 mounted on the handle 22. An annular plug 37, which surrounds the shaft 33, is screw threaded into the member 11 and holds the pinion 32 in position. It will be apparent that the handle 22 provides a means whereby the damper may be moved quickly until the pin 29 is directly opposite one of the openings 28, whereupon the shaft 33 and pinion 32 may be turned through a slight angle by means of the handle 35, and the pin 29 moved axially into one of the openings 28, thus locking the damper 15 in a stationary position. With this construction the member 11 may be connected to the plate 27 in a plurality of spaced relative positions.

It is desirable to provide a finer and more accurate means for moving the damper to its final position of adjustment. The openings 28 are necessarily spaced a reasonable distance apart to afford the required strength, and this consideration limits the number of damper positions possible with the construction as described so far. In the preferred construction I accordingly provide means for adjusting the plate 27 about the axis of the shaft 12. The adjusting mechanism is preferably irreversible, so that the damper will be firmly held in any given position of adjustment. As illustrated the plate 27 is mounted on the shaft 12 and is free to pivot thereon, a collar 39 serving to hold the plate in lateral contact with the member 11. An arm 40 extends upwardly from the plate 27, and a nut 41 is pivoted to the upper end of the arm by means of a stud 42. This nut is mounted on a horizontal screw-threaded shaft 44 which extends forwardly through the panel 10 and carries a hand wheel 45 on its forward end. Axial movement of the shaft is prevented by means of collars 46 and 47 mounted on the shaft in front of and in the rear of the panel 10. The panel may be strengthened adjacent to the shaft by means of a horizontally extending channel 48. Locked nuts 49 on the shaft 44 serve as abutments to limit the movement of the nut 41 and the plate 27. By rotating the shaft 44 by means of the hand-wheel 45, the nut 41 may be moved along the shaft and the plate 27 thereby adjusted as finely as desired. The shaft 44 is mounted somewhat loosely in the panel to allow the slight angular movement necessitated by the fact that the nut 41 travels in a circular arc.

In order that the damper 15 may be actuated automatically when desired, I provide an automatic regulator 51 which is illustrated diagrammatically. This regulator may be of any suitable type, one construction being disclosed in my prior United States Patent No. 1,653,324. The regulator is arranged to actuate a plate 52 which is mounted adjacent to the member 11 and at the opposite side thereof from the plate 27. This plate is arranged to pivot coaxilly with the member 11 in response to the movements of the regulator. In the illustrated construction the plate 52 is keyed to the shaft 12, which is free to rotate in the bearings 14, and an arm 53 is also keyed to the shaft and projects rearwardly therefrom. A vertical rod 54 connects the arm 53 with the regulator. The plate 52 is provided with a single opening 56 which is spaced the same distance as the openings 28 from the axis of the shaft 12, and a bolt or pin 57 (Fig. 7) is slidably mounted in the member 11 to engage the opening 56. This pin 57 is preferably integral with the pin 29 and the rack 31, and these parts may be considered as forming a single slidable pin which can be controlled by means of the handle 35. The plate 52 preferably extends a substantial distance to each side of the opening 56, so that within the limits of the possible relative movement between plate 52 and member 11, some portion of the plate will always be opposite the pin 57. This will make it impossible for a careless operator to slide the pin past the edge of the plate and perhaps cause breakage of some part of the apparatus.

The operation of the invention will now be apparent from the above disclosure. When it is desired to operate the damper 15 manually, the handle 35 is placed in a vertical position, whereby the pins 29 and 57 are located in the positions shown in Fig. 7. The member 11 is thus disconnected from both the plates 27 and 52, and can be moved by means of the handle 22. The damper 15 is always connected to the member 11 and hence moves therewith. In case the operator wishes to lock the damper in a certain position, he may move it to approximately the correct point and then by exerting a slight pressure on the handle 35 to the left as he faces the panel, and at the same time moving the handle 22 slightly up or down, he may slide the pin 29 into the nearest opening 28. The final damper position may then be obtained by turning the handwheel 45 and thus revolving the plate 27 and member 11 slightly about the shaft 12. To place the damper under control of the automatic regulator 51, the operator may turn the handle 35 into a vertical position and exert a slight pressure thereon to the right, while he moves the handle 22 up or down to bring the pin 57 opposite to the opening 56. In this way he may slide the pin into the opening and lock the member 11 to the plate 52, which moves at all times in response to the regulator. The handle 35 always serves as an indicator, and the operator may ascertain by its position whether the damper is under manual or automatic control. The entire construction is simple to operate, and there is nothing which is liable to cause trouble in actual service.

Having thus described my invention, what I claim as new and desire to secure by Letters Patent is:

1. A control apparatus comprising a pivotally mounted member arranged to be connected to a movable element, means to actuate the member manually, a stationary plate adjacent to the member, a movable plate adjacent to the member and arranged to be actuated by an automatic regulator, and a single manually operable device whereby the member may be connected either to the stationary plate or to the movable plate.

2. A control apparatus comprising a pivotally mounted member arranged to be connected to a movable element, means to actuate the member manually, a normally stationary plate adjacent to the member, a movable plate mounted coaxially with the member and arranged to be actuated by an automatic regulator, means to connect the member to either of the plates as desired, and manually operable means to adjust the normally stationary plate coaxially with the member.

3. A control apparatus comprising a pivotally mounted member arranged to be connected to a movable element, means to actuate the member manually, a movable plate mounted coaxially with the member and arranged to be actuated by an automatic regulator, releasable means to connect the member to the movable plate, a normally stationary plate, releasable means to connect the member to the normally stationary plate in a plurality of spaced relative positions, and manually operable means whereby the normally stationary plate may be pivotally adjusted coaxially with the member.

4. A control apparatus comprising a substantially vertical panel, a pivotally mounted member located in the rear of the panel and arranged to be connected to a movable element, a handle connected to the member and projecting forwardly through the panel, a stationary plate adjacent to the member, a movable plate mounted coaxially with the member and arranged to be actuated by an automatic regulator, and manually operable means for connecting the member to either of said plates as desired.

5. A control apparatus comprising a pivotally mounted member arranged to be connected to a movable element, a pair of plates pivotally mounted coaxially with the member, means to actuate one of the plates manually, means to actuate the other plate automatically, and manually operable means to connect the member to either of said plates as desired.

6. A control apparatus comprising a pair of spaced plates, a member located between the plates and arranged to be connected to a movable element, said plates and member all being pivotally mounted about the same axis, means to actuate the member manually, irreversible means to actuate one of said plates manually, means to actuate the other of said plates automatically, releasable means to connect the member to the automatically actuated plate, and releasable means to connect the member to the manually operable plate in a plurality of spaced relative positions.

7. A control apparatus comprising a pair of spaced plates, a member located between the plates and arranged to be connected to a movable element, said plates and member all being pivotally mounted about the same axis, means to actuate the member manually, irreversible means to actuate one of said plates manually, means to actuate the other of said plates automatically, and a manually operable pin slidably mounted in the member and so arranged that the member may be connected to either of the plates or disconnected from both of them.

8. A control apparatus comprising a pair of spaced plates, a member located between the plates and arranged to be connected to a movable element, said plates and member all being pivotally mounted about the same axis, means to actuate the member manually, irreversible means to actuate one of said plates manually, means to actuate the other of said plates automatically, the manually actuated plate having a series of spaced openings located in a circular arc having its center on the said axis, and the automatically actuated plate having an opening spaced from the axis a distance equal to the radius of said arc, and a manually operable pin slidably mounted in the member and arranged to enter either the opening in the automatically actuated plate or a selected opening in the manually actuated plate, whereby the member may be connected to either of said plates or disconnected from both of them.

9. A control apparatus comprising a pair of spaced plates, a member located between the plates and arranged to be connected to a movable element, said plates and member all being pivotally mounted about the same axis, means to actuate the member manually, a manually operable screw-threaded shaft, a nut on the shaft, connections between the nut and one of the plates whereby the plate may be actuated manually, means to actuate the other of said plates automatically, the manually actuated plate having a series of spaced openings located in a circular arc having its center on the said axis, and the automatically actuated plate having an opening spaced from the axis a distance equal to the radius of said arc, a pin slidably mounted in the member and arranged to enter either the opening in the automatically actuated plate or a selected opening in the manually actuated plate, a rack connected to the pin, a spur pinion in mesh with the rack, and a manually operable shaft connected to the pinion.

10. A control apparatus comprising a substantially vertical panel, a shaft mounted in the rear of the panel, a pair of spaced plates, a member located between the plates and arranged to be connected to a movable element, said plates and member being mounted on the shaft and pivotally movable relative to each other, a handle connected to the member and projecting forwardly through the panel, means to actuate one of said plates automatically, irreversible means including a handwheel in front of the panel to actuate the other of said plates manually, the manually actuated plate having a series of spaced openings and the automatically actuated plate having a single opening, all said openings being located the same distance from the axis of the shaft, a pin slidable in the member and arranged to enter either the opening in the automatically actuated plate or a selected opening in the manually actuated plate, and means to actuate the pin manually from a position in front of the panel.

Signed at Decatur, Illinois, this 5th day of April, 1932.

CHARLES M. TERRY.